US008416051B2

(12) United States Patent
Matsuura et al.

(10) Patent No.: US 8,416,051 B2
(45) Date of Patent: Apr. 9, 2013

(54) MAGNETIC MATERIAL AND COIL COMPONENT USING THE SAME

(75) Inventors: Hitoshi Matsuura, Takasaki (JP); Kenji Otake, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/313,999

(22) Filed: Dec. 7, 2011

(65) Prior Publication Data

US 2012/0274437 A1 Nov. 1, 2012

(30) Foreign Application Priority Data

Apr. 27, 2011 (JP) ................................ 2011-100095
Oct. 6, 2011 (JP) ................................ 2011-222093

(51) Int. Cl.

| | |
|---|---|
| ***H01F 27/24*** | (2006.01) |
| ***H01F 5/00*** | (2006.01) |
| ***H01F 27/02*** | (2006.01) |
| ***H01F 17/04*** | (2006.01) |
| ***C01G 49/08*** | (2006.01) |
| ***C04B 35/00*** | (2006.01) |
| ***C04B 35/26*** | (2006.01) |

(52) U.S. Cl.
USPC ............ 336/233; 336/200; 336/221; 336/83; 252/62.51 R; 252/62.56; 252/62.58; 252/62.59; 252/62.51 C

(58) Field of Classification Search .................. 336/200, 336/233, 234, 83, 221, 223; 252/62.51 R, 252/62.51 C, 62.53, 62.55, 62.56, 62.58, 252/62.59; 428/453, 455, 456
See application file for complete search history.

(56) References Cited

U.S. PATENT DOCUMENTS

| | | | | |
|---|---|---|---|---|
| 5,522,946 | A * | 6/1996 | Tomita et al. | 148/304 |
| 6,392,525 | B1 | 5/2002 | Kato et al. | |
| 6,784,782 | B2 | 8/2004 | Inoue et al. | |
| 8,018,313 | B2 | 9/2011 | Tada et al. | |
| 2007/0290161 | A1* | 12/2007 | Tokuoka et al. | 252/62.54 |
| 2008/0029300 | A1 | 2/2008 | Harada et al. | |
| 2008/0061264 | A1* | 3/2008 | Maeda et al. | 252/62.51 R |
| 2008/0152897 | A1* | 6/2008 | Maeda et al. | 428/323 |
| 2008/0231409 | A1* | 9/2008 | Kugai et al. | 336/233 |
| 2010/0289609 | A1* | 11/2010 | Liao et al. | 336/221 |

(Continued)

FOREIGN PATENT DOCUMENTS

| | | |
|---|---|---|
| JP | H09-074011 A | 3/1997 |
| JP | 2000-030925 A | 1/2000 |

(Continued)

OTHER PUBLICATIONS

Written Opinion of the International Searching Authority for International application No. PCT/JP2011/073559, dated Nov. 22, 2011.

*Primary Examiner* — Mohamad Musleh
*Assistant Examiner* — Mangtin Lian
(74) *Attorney, Agent, or Firm* — Law Office of Katsuhiro Arai

(57) ABSTRACT

A magnetic material constituted by a grain-compacted body comprising a plurality of metal grains made of a Fe—Si—M soft magnetic alloy (where M is a metal element more easily oxidized than Fe) and an oxide film formed on the surface of the metal grains; wherein there are bonding portions via the oxide film formed on the surfaces of adjacent metal grains and direct bonding portions of metal grains in locations where the oxide film is not present.

17 Claims, 6 Drawing Sheets

U.S. PATENT DOCUMENTS

| | | | | |
|---|---|---|---|---|
| 2011/0024670 | A1* | 2/2011 | Otsuki et al. | 252/62.54 |
| 2011/0267167 | A1 | 11/2011 | Ogawa et al. | |
| 2012/0038449 | A1 | 2/2012 | Ogawa et al. | |

FOREIGN PATENT DOCUMENTS

| | | | |
|---|---|---|---|
| JP | 2001-011563 | A | 1/2001 |
| JP | 2001-118725 | A | 4/2001 |
| JP | 2002-305108 | A | 10/2002 |
| JP | 2002-313620 | A | 10/2002 |
| JP | 2002-343618 | A | 11/2002 |
| JP | 2007-019134 | A | 1/2007 |
| JP | 2007-027354 | A | 2/2007 |
| JP | 2007-123703 | A | 5/2007 |
| JP | 2007-299871 | A | 11/2007 |
| JP | 2008-028162 | A | 2/2008 |
| JP | 2008-041961 | A | 2/2008 |
| JP | 2008-195986 | A | 8/2008 |
| JP | 2009-088496 | A | 4/2009 |
| JP | 2009-088502 | A | 4/2009 |
| WO | 2009/128425 | A1 | 10/2009 |

* cited by examiner

1, : Grain compact, 11: Metal grain, 12: Oxide film,
21: Direct bonding portion of metal grains,
22: Joint via oxide film,
30: Void

MAGNETIC MATERIAL AND COIL COMPONENT USING THE SAME

BACKGROUND

1. Field of the Invention

The present invention relates to a magnetic material that can be used primarily as the magnetic core of a coil, inductor, etc., as well as a coil component that uses such magnetic material.

2. Description of the Related Art

Coil components such as inductors, choke coils and transformers (so-called "inductance components") have a magnetic material and a coil formed inside or on the surface of the magnetic material. For the magnetic material, Ni—Cu—Zn and other ferrites are generally used.

In recent years, there has been a demand for coil components of this type offering electrical current amplification (i.e., higher rated current) and, to meet this demand, switching the material for their magnetic body from conventional ferrites to Fe—Cr—Si alloy is being examined (refer to Patent Literature 1). Fe—Cr—Si alloy and Fe—Al—Si alloy are characterized by a higher saturated magnetic flux density than those of ferrites, but significantly lower volume resistivity compared to those of conventional ferrites.

Patent Literature 1 discloses a method for manufacturing a magnetic body for coil components of the laminated type, which comprises laminating a magnetic layer formed by a magnetic paste containing Fe—Cr—Si alloy grains as well as a glass component, with a conductive pattern, baking the laminate in a nitrogen ambience (reducing ambience), and then impregnating the baked laminate with a thermo-setting resin.

However, the manufacturing method described in Patent Literature 1 allows the glass component contained in the magnetic paste to remain in the magnetic body, and this glass component in the magnetic body causes the volume ratio of Fe—Cr—Si alloy grains to drop, which in turn reduces the saturated magnetic flux density of the component itself.

In the meantime, a powder-compacted magnetic core formed by mixing in a binder is known for use with inductors that use a metal magnetic body. However, general powder-compacted magnetic cores cannot be directly connected to electrodes due to their low insulation resistance.

Any discussion of problems and solutions involved in the related art has been included in this disclosure solely for the purposes of providing a context for the present invention, and should not be taken as an admission that any or all of the discussion were known at the time the invention was made.

Patent Literature

[Patent Literature 1] Japanese Patent Laid-open No. 2007-027354

SUMMARY

In consideration of the above, an object of the present invention is to provide a new magnetic material capable of improving both insulation resistance and magnetic permeability, as well as a coil component that uses such magnetic material.

After studying in earnest the inventors completed the present invention as described below.

The magnetic material proposed by the present invention is constituted by a grain-compacted body made of metal grains on which an oxide film is formed. The metal grains are made of a Fe—Si—M soft magnetic alloy (where M is a metal element more easily oxidized than Fe), while the grain-compacted body has bonding portions where adjacent metal grains are connected to each other via the oxide film formed on their surface, and bonding portions where metal grains are interconnected without an oxide film present in between. Here, "bonding portions where metal grains are interconnected without an oxide film present in between" mean areas where metal grains are directly contacting each other at their respective metal parts, where this notion includes a metallic bond in the strict sense, embodiments where metal parts are contacting each other but atoms are not exchanged, and any embodiment in between, for example. A metallic bond in the strict sense means the requirement of "Regular alignment of atoms" is satisfied, among others.

Additionally, the oxide film is an oxide film of Fe—Si—M soft magnetic alloy (where M is a metal element more easily oxidized than Fe), and the mol ratio of the metal element denoted by M relative to the Fe element is preferably greater in the oxide film than that in the aforementioned metal grain.

Additionally, a B/N ratio where N represents the number of metal grains in a cross section of the grain-compacted body and B represents the number of direct bonding portions of metal grains in the cross section is preferably 0.1 to 0.5.

Additionally, the magnetic material proposed by the present invention is preferably obtained by forming a compact constituted by multiple metal grains produced by the atomization method and then heat-treating the compact in an oxidizing atmosphere.

Additionally, the grain-compacted body preferably have voids inside, at least some of which voids are impregnated with a polymer resin.

According to the present invention, a coil component comprising any one of the magnetic materials explicitly, necessarily, or inherently disclosed herein and a coil formed inside or on the surface of the magnetic material is also provided.

According to the present invention, a magnetic material offering both high magnetic permeability and high insulation resistance is provided, and a coil component using this material can have electrodes directly connected to it.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
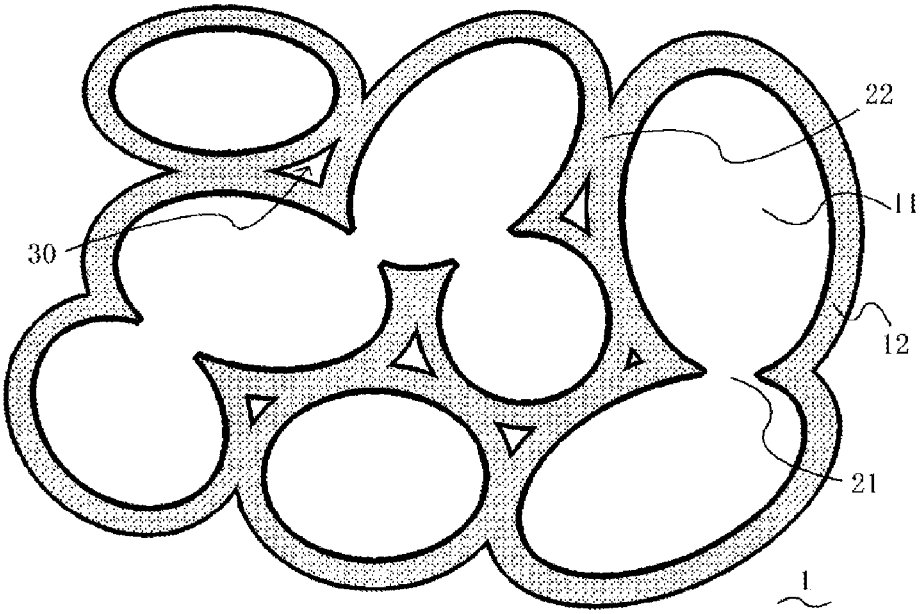
FIG. 1 is a schematic section view of the fine structure of a magnetic material conforming to the present invention.

1, 2: Grain-compacted body
11: Metal grain
12: Oxide film
21: Direct bonding portion of metal grains
22: Bonding portion via oxide film
30: Void
31: Polymer resin
110: Magnetic material
111, 112: Magnetic core
114: External conductive film
115: Coil
210: Laminated inductor
211: Main component body
212: Magnetic body
213: Coil
214, 215: External terminal

DETAILED DESCRIPTION

In some embodiments, the term "oxide film" refers to a film formed by oxidization of metal grains after being shaped into a grain-compacted body or a coil component, said film being substantially the sole film formed on the metal grains in the grain-compacted body. In some embodiments, the term "direct bonding" refers to physically contacting without any additional intervening layers therebetween. In this disclosure, any defined meanings do not necessarily exclude ordinary and customary meanings in some embodiments. Also, in this disclosure, "the invention" or "the present invention" refers to at least one of the embodiments or aspects explicitly, necessarily, or inherently disclosed herein. The term "metal grains" refers to metal grains including an oxide film formed thereon, but also refers to metal grains without an oxide film, depending on the context. Further, in this disclosure, "a" may refer to a species or a genus including multiple species.

The present invention is described in detail by referring to the drawings as necessary. Note, however, that the present invention is not at all limited to the embodiments illustrated and, because the characteristic aspects of the invention may be emphasized in the drawings, accuracy of scale is not guaranteed in each part of the drawing.

According to the present invention, the magnetic material is constituted by a grain-compacted body made by forming specified grains.

In the present invention, the magnetic material serves as a magnetic path in a coil, inductor or other magnetic component and typically takes the form of the magnetic core, etc., of a coil.

FIG. 1 is a schematic section view showing the fine structure of a magnetic material conforming to the present invention. In the present invention, microscopically a grain-compacted body 1 is understood as an aggregate of many originally independent metal grains 11 that are interconnected with one another, and these individual metal grains 11 have an oxide film 12 formed almost completely around them, where this oxide film 12 ensures insulation property of the grain-compacted body 1. Adjacent metal grains 11 mainly constitute the grain-compacted body 1 having a specific shape, by means of bonding via the oxide film 12 formed on each metal grain 11. According to the present invention, these adjacent metal grains 11 are partially bonded with one another at their metal parts (reference numeral 21). In this Specification, metal grains 11 are grains made of the alloy material described later and, when absence of the oxide film 12 is to be emphasized, they may be referred to as "metal parts" or "cores." Conventional magnetic materials use magnetic grains or several aggregates of magnetic grains dispersed in a hardened organic resin matrix, or magnetic grains or several aggregates of magnetic grains dispersed in a hardened glass component matrix. Under the present invention, it is preferable that substantially neither a matrix of organic resin nor a matrix of a glass component be present.

Individual metal grains 11 are mainly constituted by a specified soft magnetic alloy. Under the present invention, metal grains 11 are made of a Fe—Si—M soft magnetic alloy. Here, M is a metal element more easily oxidized than Fe, and typically it is Cr (chromium), Al (aluminum), Ti (titanium), etc., but preferably Cr or Al.

The percentage of content of Si in the Fe—Si—M soft magnetic alloy is preferably in a range of 0.5 to 7.0 percent by weight, or more preferably in a range of 2.0 to 5.0 percent by weight. This is based on the fact that the greater the content of Si, the higher the resistivity and magnetic permeability become, which is preferable, while a lower content of Si results in better formability.

If M is Cr, the percentage of content of Cr in the Fe—Si—M soft magnetic alloy is preferably in a range of 2.0 to 15 percent by weight, or more preferably in a range of 3.0 to 6.0 percent by weight. Presence of Cr is desired because it forms a passive state during heat treatment to suppress excessive oxidization and also to express strength and insulation resistance. From the viewpoint of improvement of magnetic characteristics, on the other hand, Cr is preferably kept low. The above favorable range is proposed by considering the above.

If M is Al, the percentage of content of Al in the Fe—Si—M soft magnetic alloy is preferably in a range of 2.0 to 15 percent by weight, or more preferably be in a range of 3.0 to 6.0 percent by weight. Presence of Al is desired because it forms a passive state during heat treatment to suppress excessive oxidization and also express strength and insulation resistance. From the viewpoint of improvement of magnetic characteristics, on the other hand, Al is preferably kept small. The above favorable range is proposed by considering the above.

Note that the above favorable percentages of content of each metal component in the Fe—Si—M soft magnetic alloy assume that the entire amount of alloy components equals 100 percent by weight. In other words, the composition of oxide film is excluded from the calculations of above favorable contents.

In the Fe—Si—M soft magnetic alloy, the part other than Si and metal M is preferably Fe except for unavoidable impurities. Metals that can be included other than Fe, Si and M include Mn (manganese), Co (cobalt), Ni (nickel) and Cu (copper), among others.

The chemical compositions of the alloy constituting each metal grain 11 in the grain-compacted body 1 may be calculated by, for example, capturing a cross section image of the grain-compacted body 1 using a scanning electron microscope (SEM) and then analyzing the image by energy dispersive X-ray spectrometry (EDS) via the ZAF method.

The individual metal grains 11 constituting the grain-compacted body 1 have an oxide film 12 formed around them. It can be said that there is a core (or metal grain 11) made of the soft magnetic alloy, and an oxide film 12 formed around this core. The oxide film 12 may be formed in the stage of material grains before the grain-compacted body 1 is formed, or it is also possible to not generate any oxide film or generate only an extremely small amount of oxide film in the stage of material grains and generate an oxide film in the forming process. Presence of the oxide film 12 can be recognized as a contrast (brightness) difference in an image of approx. ×3000 as captured by a scanning electron microscope (SEM). Presence of this oxide film 12 guarantees insulation property of the magnetic material as a whole.

The oxide film 12 is should only be a metal oxide, and preferably the oxide film 12 is an oxide of Fe—Si—M soft magnetic alloy (where M is a metal element more easily oxidized than Fe), where the mol ratio of the metal element denoted by M relative to the Fe element is preferably greater than that in the aforementioned metal grain. To obtain an oxide film 12 having this constitution, material grains used to obtain the magnetic material should contain as little Fe oxide as possible, or should not contain any Fe oxide whenever possible, and in this condition the surface of the alloy should be oxidized by means of heat treatment, etc., in the process of obtaining the grain-compacted body 1. Such treatment enables metal M that is more easily oxidized than Fe to be selectively oxidized, and as a result, the mol ratio of metal M relative to Fe in the oxide film 12 becomes relatively greater than the mol ratio of metal M relative to Fe in the metal grain 11. Since the metal element denoted by M is contained in a greater amount than Fe in the oxide film 12, excessive oxidization of alloy grains can be suppressed, which is beneficial.

The method to measure the chemical composition of the oxide film 12 in the grain-compacted body 1 is as follows. First, the grain-compacted body 1 is fractured or otherwise its cross section is exposed. Next, the surface is smoothed by ion milling, etc., and its image captured with a scanning electron microscope (SEM), after which the oxide film 12 is analyzed by energy dispersive X-ray spectroscopy (EDS) using the ZAF method.

The content of metal M in the oxide film 12 is preferably in a range of 1.0 to 5.0 mol, or more preferably be in a range of 1.0 to 2.5 mol, or most preferably be in a range of 1.0 to 1.7 mol, relative to 1 mol of Fe. Increasing the aforementioned content is desirable because it suppresses excessive oxidization, while decreasing the aforementioned content is desirable because it allows for sintering between metal grains. The aforementioned content can be increased by, for example, providing heat treatment in a weak-oxidizing atmosphere, while the aforementioned content can be decreased by, for example, providing heat treatment in a strong-oxidizing atmosphere.

In the grain-compacted body 1, grain bonding portions are mainly bonding portions 22 via the oxide film 12. Presence of a bonding portion 22 via the oxide film 12 can be clearly determined by, for example, visually confirming on a SEM observation image to approx. ×3000 that the oxide films 12 on adjacent metal grains 11 have the same phase. For example, even when the oxide films 12 of adjacent metal grains 11 are contacting each other, it may not necessarily be a bonding portion 22 via the oxide film 12 in locations where an interface is observed between the adjacent oxide films 12 on the SEM observation image, etc. The presence of bonding portions 22 via the oxide film 12 leads to improved mechanical strength and insulation property. Desirably, adjacent metal grains 11 are bonded via their oxide film 12 throughout the grain-compacted body 1, but as long as metal grains are partially bonded this way, mechanical strength and insulation property can be improved sufficiently, and this mode is also an embodiment of the present invention. Similarly, as explained later, metal grains 11 may be partially bonded with one another not via the oxide film 12. Furthermore, it is permitted that some adjacent metal grains 11 remain in contact with or close to one another physically without any bonding portion via the oxide film 12 or direct bonding portion of metal grains 11.

Bonding portions 22 via the oxide film 12 can be generated by, for example, providing heat treatment at the specified temperature mentioned later in an atmosphere of oxygen (such as air) when the grain-compacted body 1 is manufactured.

According to the present invention, the grain-compacted body 1 not only has bonding portions 22 via the oxide film 12, but it also has direct bonding portions 21 of metal grains 11. Just as with the aforementioned bonding portion 22 via the oxide film 12, presence of a direct bonding portion 21 of metal grains 11 can be clearly determined by, for example, observing a SEM cross section image of approx. ×3000 to visually confirm, among others, that a relatively deep concavity is seen along the curved line drawn by the grain surface and that there is a bonding point without oxide film between the adjacent metal grains 11 at a location where the two grain surface curves intersect with each other. One key effect of the present invention is improved magnetic permeability due to the presence of direct bonding portions 21 of metal grains 11.

Direct bonding portions 21 of metal grains 11 can be generated by, for example, using as material grains those subject to less formation of oxide film, adjusting the temperature and oxygen partial pressure in the heat treatment applied to manufacture the grain-compacted body 1 as explained later, or adjusting the forming density when the grain-compacted body 1 is obtained from material grains, among others. The heat treatment temperature is desirably such that metal grains 11 are bonded with one another easily but that oxide does not generate easily, where the specific range of favorable temperatures will be mentioned later. The oxygen partial pressure may be the oxygen partial pressure in air, for example, because the lower the oxygen partial pressure, the less easily it becomes for oxide to generate and consequently the easier it becomes for metal grains 11 to bond to one another.

According to a favorable embodiment of the present invention, a majority of bonding portions between adjacent metal grains 11 are bonding portions 22 via the oxide film 12, and there are partially direct bonding portions 21 of metal grains. The degree to which direct bonding portions 21 of metal grains are present can be quantified as follows. The grain-compacted body 1 is cut and a SEM observation image of its cross section is obtained at approx. ×3000. With the SEM observation image, the field of view and other conditions are adjusted so that 30 to 100 metal grains 11 are captured. Then, the number of metal grains 11, or N, and number of direct bonding portions 21 of metal grains 11, or B, are counted in the observation image. The ratio of these values, B/N, is used as the evaluation indicator for degree of presence of direct bonding portions 21 of metal grains. How to count N and B mentioned above is explained by using the embodiment in FIG. 1 as an example. If the image shown in FIG. 1 is obtained, the number of metal grains 11, or N, is 8, while the number of direct bonding portions 21 of metal grains 11, or B, is 4. Accordingly, in this embodiment the B/N ratio is 0.5. Under the present invention, the B/N ratio is preferably in a range of 0.1 to 0.5, or more preferably be in a range of 0.1 to 0.35, and most preferably be in a range of 0.1 to 0.25. Since a greater B/N improves magnetic permeability, while a smaller B/N improves insulation resistance, the above favorable range is presented in consideration of improving both magnetic permeability and insulation resistance.

The magnetic material proposed by the present invention can be manufactured by forming metal grains made of a specific alloy. At this time, a grain-compacted body having a desired overall shape can be obtained by bonding adjacent metal grains mainly via an oxide film, and partially not via an oxide film.

For the metal grains used as material (hereinafter also referred to as "material grains"), grains mainly constituted by a Fe—Si—M soft magnetic alloy are used. The alloy composition of material grains is reflected in the alloy composition of the eventually obtained magnetic material. Accordingly, an appropriate alloy composition of material grains can be selected as deemed appropriate according to the alloy composition of the magnetic material that should be obtained eventually, and a favorable range of such composition is the same as the aforementioned range of favorable compositions of the magnetic material. Individual material grains may be covered with an oxide film. In other words, each individual material grain may be constituted by a core made of a specific soft magnetic alloy and an oxide film that at least partially covers the periphery of the core.

The size of individual material grains is virtually equivalent to the size of grains that constitute the grain-compacted body 1 of the eventually obtained magnetic material. As for the size of material grains, d50 is preferably in a range of 2 to 30 or more preferably in a range of 2 to 20 μm, and a more favorable lower limit of d50 is 5 μm, in consideration of magnetic permeability and eddy current loss in the grain. Measuring equipment capable of laser diffraction and scattering can be used to measure d50 of material grains. The term "d50" refers to a median or the $50^{th}$ percentile size based on volume.

Material grains are manufactured by the atomization method, for example. As mentioned above, the grain-compacted body 1 not only has bonding portions 22 via the oxide film 12, but it also has direct bonding portions 21 of metal grains 11. Accordingly, although an oxide film may be present on material grains, it should not be excessive. Grains manufactured by the atomization method are desirable in that they have relatively less oxide film. The ratio of the alloy core and oxide film of the material grain can be quantified as follows. The material grain is analyzed by XPS and, by focusing on the peak intensity of Fe, the integral value $Fe_{Metal}$ at the peak (706.9 eV) where Fe is present as metal, and the integral value $Fe_{Oxide}$ at the peak where Fe is present as oxide, are obtained, to quantify the above ratio by calculating $Fe_{Metal}/(Fe_{Metal}+Fe_{Oxide})$. Here, during the calculation of $Fe_{Oxide}$, fitting to the measured data is performed as a superposition of normal distributions of three types of oxides, namely $Fe_2O_3$ (710.9 eV), FeO (709.6 eV) and $Fe_3O_4$ (710.7 eV), based on coupling energy. As a result, $Fe_{Oxide}$ is calculated as a sum of integral areas after peak separation. The aforementioned value is preferably 0.2 or more because then alloy bonding portions 21 can be generated easily during heat treatment and consequently magnetic permeability becomes higher. The upper limit of the aforementioned value is not specifically defined and it may be 0.6, for example, or preferably 0.3, from the viewpoint of ease of manufacturing. Methods to raise the aforementioned value include providing heat treatment in a reducing atmosphere or providing chemical treatment such as removal of surface oxide layer using acid. The reducing process may be implemented by, for example, using a nitrogen or argon atmosphere containing 25 to 35 percent of hydrogen for 0.5 to 1.5 hours at 750 to 850° C. The oxidizing process may be implemented by, for example, using air for 0.5 to 1.5 hours at 400 to 600° C.

The aforementioned material grains may adopt any known alloy grain manufacturing method, or use any commercial product such as PF20-F by Epson Atmix Corp., or SFR-FeSiAl by Nippon Atomized Metal Powders Corp., among others. Since it is highly likely that commercial products do not consider the value of $Fe_{Metal}/(Fe_{Metal}+Fe_{Oxide})$ mentioned above, it is also desirable to screen material grains or provide a pre-treatment in the form of heat treatment or chemical treatment as mentioned above.

The method to obtain the compact from material grains is not specifically limited, and any known grain-compacted body manufacturing means can be incorporated as deemed appropriate. A typical manufacturing method is explained below, where material grains are formed under non-heating conditions and then formed grains are heated. The present invention is not at all limited to this manufacturing method.

When forming material grains under non-heating conditions, it is desirable to add an organic resin as a binder. The organic resin is preferably made of acrylic resin, butyral resin, vinyl resin or other resin whose thermal decomposition temperature is 500° C. or below, because little binder will remain after the heat treatment. During forming, any known lubricant can be added. Examples of this lubricant include organic acid salts, etc., or specifically zinc stearate and calcium stearate. The amount of lubricant is preferably in a range of 0 to 1.5 parts by weight, or more preferably in a range of 0.1 to 1.0 part by weight, relative to 100 parts by weight of material grains. When the amount of lubricant is zero, it means no lubricant is used. Material grains are agitated after adding a binder and/or lubricant as desired, after which the grains are formed into a desired shape. During forming, 5 to 10 $t/cm^2$ of pressure is applied, for example.

A favorable embodiment of heat treatment is explained.

Heat treatment is preferably implemented in an oxidizing atmosphere. To be specific, the oxygen concentration is preferably 1% or more during heating, as this makes it easy for both bonding portions 22 via oxide film and direct bonding portions 21 of metal grains to generate. The upper limit of oxygen concentration is not specifically defined, but the oxygen concentration in air (approx. 21%) may be used as a guide in consideration of manufacturing cost, etc. The heating temperature is preferably between 600° C. or above as it makes it easy for an oxide film 12 to generate and consequently bonding portions via the oxide film 12 to generate, and 900° C. or below as it suppresses oxidization in an appropriate manner to maintain presence of direct bonding portions 21 of metal grains, thereby enhancing the magnetic permeability. A more preferable range of heating temperatures is 700 to 800° C. The heating time is preferably in a range of 0.5 to 3 hours as it makes it easy for both bonding portions 22 via the oxide film 12 and direct bonding portions 21 of metal grains to generate.

Figure 2:
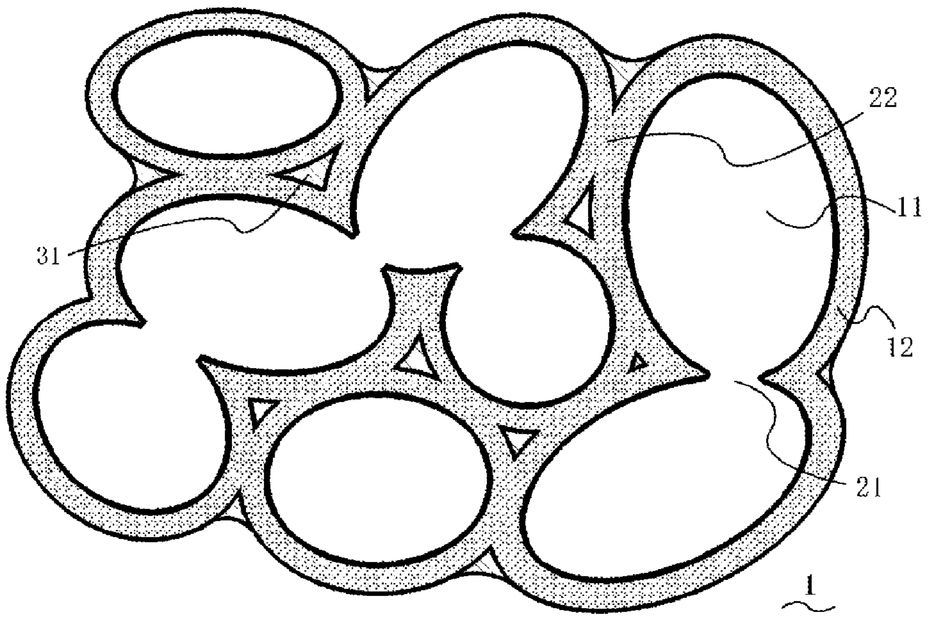
FIG. 2 is a schematic section view of the fine structure of another example of a magnetic material conforming to the present invention.

The obtained grain-compacted body 1 may have voids 30 inside. FIG. 2 is a schematic section view of the fine structure of another example of magnetic material conforming to the present invention. According to the embodiment illustrated in FIG. 2, a polymer resin 31 is impregnated at least in some voids present in the grain-compacted body 1. Means of polymer resin 31 impregnation include, for example, soaking the grain-compacted body 1 in a liquid form of polymer resin such as polymer resin in liquid state or solution of the polymer resin and then lowering the manufacturing pressure, as well as coating the aforementioned liquid form of polymer resin onto the grain-compacted body 1 and letting it seep into the voids 30 near the surface. Impregnating a polymer resin in voids 30 in the grain-compacted body 1 provides the advantages of strength enhancement and suppression of hygroscopic property. This polymer resin is not specifically limited and its examples include epoxy resin, fluororesin and other organic resins, as well as silicone resin.

The grain-compacted body 1 thus obtained can be used as a magnetic material constituting various components. For example, the magnetic material proposed by the present invention may be used as a magnetic core which is wrapped with an insulating covering conductive wire to form a coil. Or, a green sheet containing the aforementioned material grains may be formed using a known method and a conductive paste may be printed or otherwise formed on the sheet in a specific pattern, after which the printed green sheets may be laminated and pressed and then heat-treated under the aforementioned conditions to obtain an inductor (coil component) having a coil formed in the magnetic material proposed by the present invention. Besides the above, various coil components may be obtained by forming a coil inside or on the surface of the magnetic material proposed by the present invention. These coil components may be of various mounting types such as a surface-mounted type and through-hole-mounted type and, for means for constituting coil components of these mounting types as well as means for obtaining these coil components from the magnetic material and, the examples described later can be used as a reference or any manufacturing methods known in the field of electronic components may be incorporated as deemed appropriate.

The present invention is explained in greater detail using examples below. Note, however, that the present invention is not at all limited to the embodiments described in these examples.

EXAMPLE 1

(Material Grains)

Commercial alloy powder manufactured by the atomization method, having a composition of Cr 4.5 percent by weight, Si 3.5 percent by weight and Fe accounting for the remainder, and an average grain size d50 of 10 μm, was used as material grains. When the surface of an aggregate made of this alloy powder was analyzed by XPS and $Fe_{Metal}/(Fe_{Metal}+Fe_{Oxide})$ mentioned above was calculated, the result was 0.25.

(Manufacturing of Grain-compacted Body)

One hundred parts by weight of these material grains were mixed and agitated with 1.5 parts by weight of an acrylic binder whose thermal decomposition temperature was 400° C., to which 0.5 part by weight of Zn stearate was added as a lubricant. Thereafter, the mixture was formed to a specific shape at 8 t/cm$^2$, and heat-treated for 1 hour at 750° C. in an oxidizing atmosphere where the oxygen concentration was 20.6%, to obtain a grain-compacted body. When the characteristics of the obtained grain-compacted body were measured, the magnetic permeability of 36 before the heat treatment increased to 48 after the heat treatment. The specific resistance was $2\times10^5$ Ωcm and strength was 7.5 kgf/mm$^2$. When a ×3000 SEM observation image of the grain-compacted body was obtained, the number of metal grains 11, or N, was 42, the number of direct bonding portions 21 of metal grains 11, or B, was 6, and the B/N ratio was 0.14. When a composition analysis was conducted on the oxide film 12 of the obtained grain-compacted body, 1.5 mol of Cr element was contained per 1 mol of Fe element.

COMPARATIVE EXAMPLE 1

Figure 9:
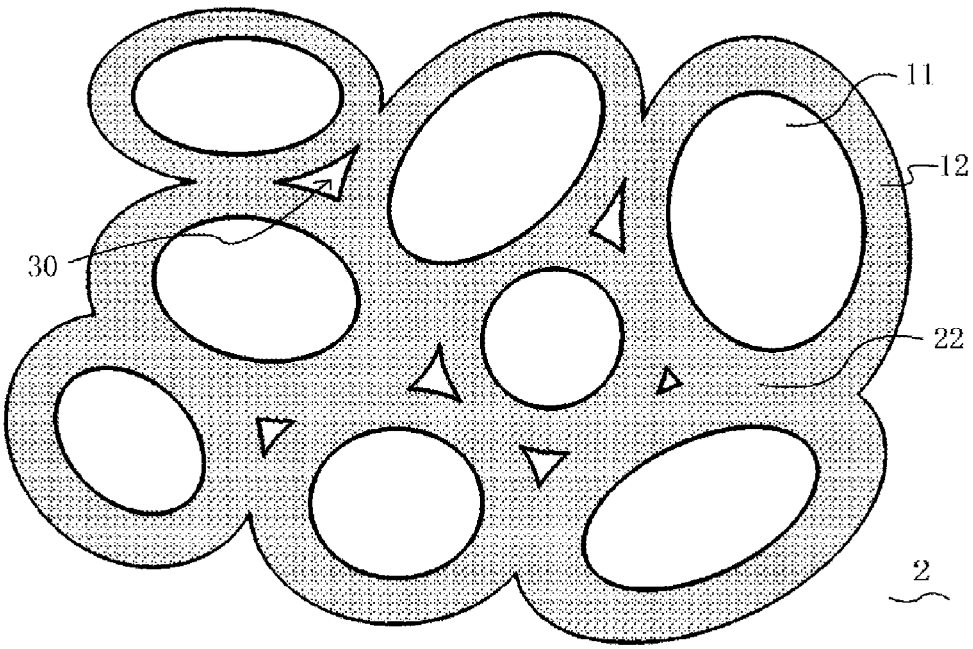
FIG. 9 is a schematic section view of the fine structure of a magnetic material in a comparative example.

The same alloy powder used in Example 1 was used as material grains, except that $Fe_{Metal}/(Fe_{Metal}+Fe_{Oxide})$ mentioned above was 0.15, and a grain-compacted body was manufactured by the same operations in Example 1. Unlike in Example 1, in Comparative Example 1 the commercial alloy powder was kept for 12 hours in a thermostatic chamber at 200° C. for drying. The magnetic permeability of 36 before the heat treatment remained 36 after the heat treatment, meaning that the magnetic permeability of the grain-compacted body did not increase. On a ×3000 SEM observation image of this grain-compacted body, presence of direct bonding portions 21 of metal grains could not be identified. In other words, the number of metal grains 11, or N, was 24, the number of direct bonding portions 21 of metal grains 11, or B, was 0, and the B/N ratio was 0, in this observation image. FIG. 9 is a schematic section view of the fine structure of the grain-compacted body in Comparative Example 1. As the grain-compacted body 2 schematically shown in FIG. 9 indicates, the grain-compacted body obtained in this comparative example did not have direct bonding portions of metal grains 11 and only bonding portions via the oxide film 12 were observed. When a composition analysis was conducted on the oxide film 12 of the obtained grain-compacted body, 0.8 mol of Cr element was contained per 1 mol of Fe element.

EXAMPLE 2

(Material Grains)

Commercial alloy powder manufactured by the atomization method, having a composition of Al 5.0 percent by weight, Si 3.0 percent by weight and Fe accounting for the remainder, and an average grain size d50 of 10 μm, was used as material grains. When the surface of an aggregate made of this alloy powder was analyzed by XPS and $Fe_{Metal}/(Fe_{Metal}+Fe_{Oxide})$ mentioned above was calculated, the result was 0.21.

(Manufacturing of Grain-compacted Body)

One hundred parts by weight of these material grains were mixed and agitated with 1.5 parts by weight of an acrylic binder whose thermal decomposition temperature was 400° C., to which 0.5 part by weight of Zn stearate was added as a lubricant. Thereafter, the mixture was formed to a specific shape at 8 t/cm$^2$, and heat-treated for 1 hour at 750° C. in an oxidizing atmosphere where the oxygen concentration was 20.6%, to obtain a grain-compacted body. When the characteristics of the obtained grain-compacted body were measured, the magnetic permeability of 24 before the heat treatment increased to 33 after the heat treatment. The specific resistance was $3\times10^5$ Ωcm and strength was 6.9 kgf/mm$^2$. On a SEM observation image, the number of metal grains 11, or N, was 55, the number of direct bonding portions 21 of metal grains 11, or B, was 11, and the B/N ratio was 0.20. When a composition analysis was conducted on the oxide film 12 of the obtained grain-compacted body, 2.1 mol of Al element was contained per 1 mol of Fe element.

EXAMPLE 3

(Material Grains)

Commercial alloy powder manufactured by the atomization method, having a composition of Cr 4.5 percent by weight, Si 6.5 percent by weight and Fe accounting for the remainder, and an average grain size d50 of 6 μm, was used as material grains. When the surface of an aggregate made of this alloy powder was analyzed by XPS and $Fe_{Metal}/(Fe_{Metal}+Fe_{Oxide})$ mentioned above was calculated, the result was 0.22.

(Manufacturing of Grain-compacted Body)

One hundred parts by weight of these material grains were mixed and agitated with 1.5 parts by weight of an acrylic binder whose thermal decomposition temperature was 400° C., to which 0.5 part by weight of Zn stearate was added as a lubricant. Thereafter, the mixture was formed to a specific shape at 8 t/cm$^2$, and heat-treated for 1 hour at 750° C. in an oxidizing atmosphere where the oxygen concentration was 20.6%, to obtain a grain-compacted body. When the characteristics of the obtained grain-compacted body were measured, the magnetic permeability of 32 before the heat treatment increased to 37 after the heat treatment. The specific resistance was $4\times10^6$ Ωcm and strength was 7.8 kgf/mm$^2$. On a SEM observation image, the number of metal grains 11, or N, was 51, the number of direct bonding portions 21 of metal grains 11, or B, was 9, and the B/N ratio was 0.18. When a composition analysis was conducted on the oxide film 12 of the obtained grain-compacted body, 1.2 mol of Cr element was contained per 1 mol of Fe element.

EXAMPLE 4

(Material Grains)

Commercial alloy powder manufactured by the atomization method, having a composition of Cr 4.5 percent by weight, Si 3.5 percent by weight and Fe accounting for the remainder, and an average grain size d50 of 10 μm, was heat-treated for 1 hour at 700° C. in a hydrogen atmosphere, and then was used as material grains. When the surface of an aggregate made of this alloy powder was analyzed by XPS and $Fe_{Metal}/(Fe_{Metal}+Fe_{Oxide})$ mentioned above was calculated, the result was 0.55.

(Manufacturing of Grain-compacted Body)

One hundred parts by weight of these material grains were mixed and agitated with 1.5 parts by weight of an acrylic binder whose thermal decomposition temperature was 400° C., to which 0.5 part by weight of Zn stearate was added as a lubricant. Thereafter, the mixture was formed to a specific shape at 8 t/cm$^2$, and heat-treated for 1 hour at 750° C. in an oxidizing atmosphere where the oxygen concentration was 20.6%, to obtain a grain-compacted body. When the characteristics of the obtained grain-compacted body were measured, the magnetic permeability of 36 before the heat treatment increased to 54 after the heat treatment. The specific resistance was $8\times10^3$ Ωcm and strength was 2.3 kgf/mm$^2$. On a SEM observation image of the obtained grain-compacted body, the number of metal grains 11, or N, was 40, number of direct bonding portions 21 of metal grains 11, or B, was 15, and the B/N ratio was 0.38. When a composition analysis was conducted on the oxide film 12 of the obtained grain-compacted body, 1.5 mol of Cr element was contained per 1 mol of Fe element. In this example, $Fe_{Metal}/(Fe_{Metal}+Fe_{Oxide})$ was high and the specific resistance and strength were slightly lower, but the magnetic permeability increased effectively.

EXAMPLE 5

(Material Grains)

The same alloy powder explained in Example 1 was used as material grains.

(Manufacturing of Grain-compacted Body)

One hundred parts by weight of these material grains were mixed and agitated with 1.5 parts by weight of an acrylic binder whose thermal decomposition temperature was 400° C., to which 0.5 part by weight of Zn stearate was added as a lubricant. Thereafter, the mixture was formed to a specific shape at 8 t/cm$^2$, and heat-treated for 1 hour at 850° C. in an oxidizing atmosphere where the oxygen concentration was 20.6%, to obtain a grain-compacted body. When the characteristics of the obtained grain-compacted body were measured, the magnetic permeability of 36 before the heat treatment increased to 39 after the heat treatment. The specific resistance was $6.0\times10^5$ Ωcm and strength was 9.2 kgf/mm$^2$. On a SEM observation image of the obtained grain-compacted body, the number of metal grains 11, or N, was 44, number of direct bonding portions 21 of metal grains 11, or B, was 5, and the B/N ratio was 0.11. When a composition analysis was conducted on the oxide film 12 of the obtained grain-compacted body, 1.1 mol of Cr element was contained per 1 mol of Fe element.

EXAMPLE 6

In this example, a winding chip inductor was manufactured as a coil component.

Figure 3:
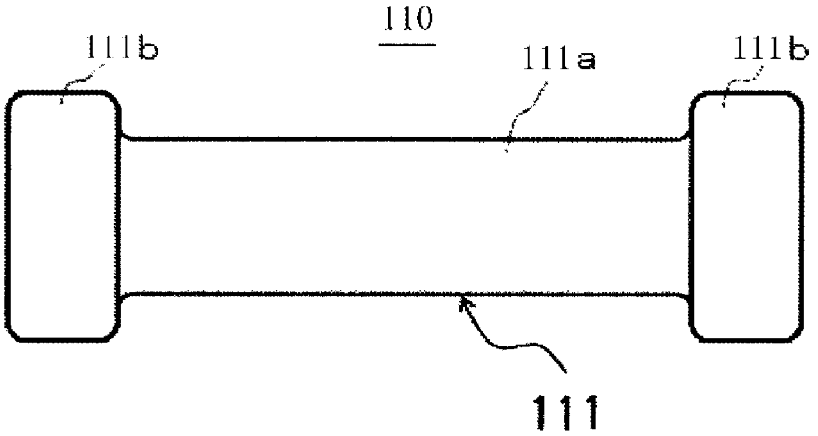
FIG. 3 is a side view showing the exterior of a magnetic material manufactured in an example of the present invention.
Figure 4:
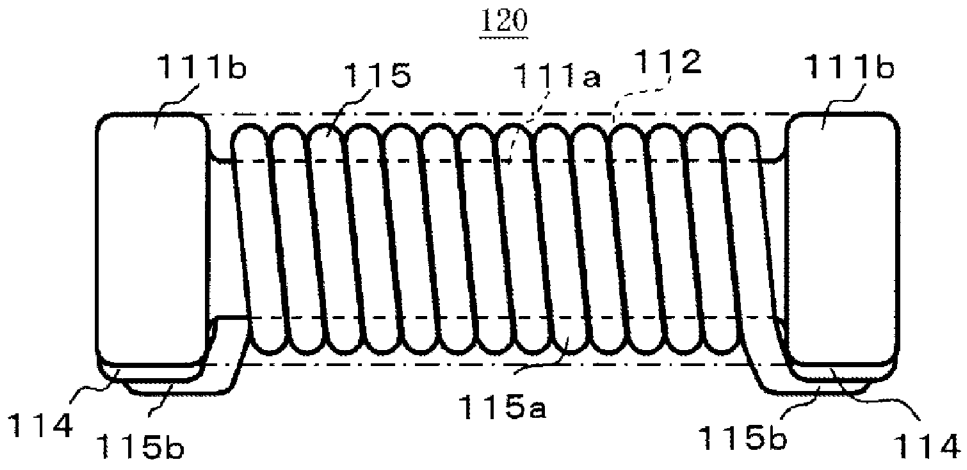
FIG. 4 is a perspective side view showing a part of an example of a coil component manufactured in an example of the present invention.
Figure 5:
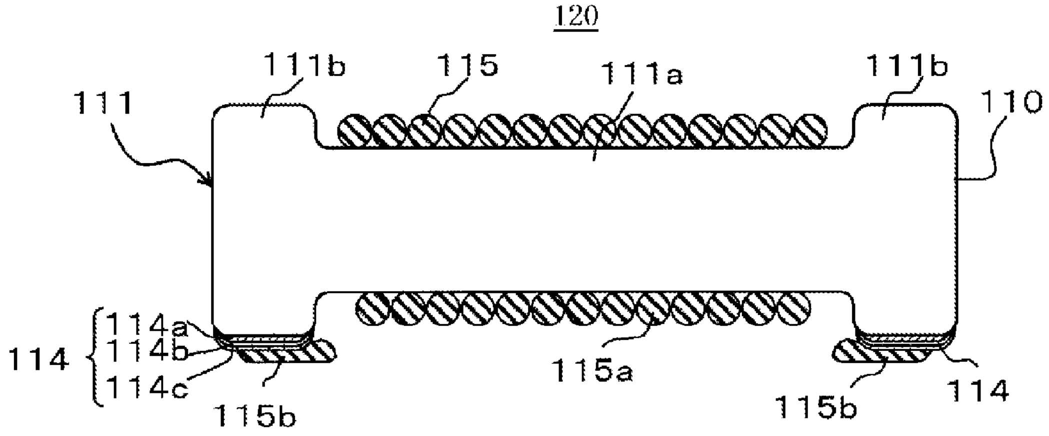
FIG. 5 is a longitudinal section view showing the internal structure of the coil component in FIG. 4.

FIG. 3 is a side view showing the exterior of the magnetic material manufactured in this example. FIG. 4 is a perspective side view showing a part of one example of a coil component manufactured in this example. FIG. 5 is a longitudinal section view showing the internal structure of the coil component in FIG. 4. A magnetic material 110 shown in FIG. 3 was used as a magnetic core for winding the coil of the winding chip inductor. A magnetic core 111 that looks like a drum from the outside had a sheet-like winding core 111*a* used for winding the coil provided in parallel with the mounting surface such as a circuit board, and a pair of flange parts 111*b* respectively provided at the opposing ends of the winding core 111*a*. The ends of the coil were electrically connected to external conductive films 114 formed on the surfaces of the flange parts 111*b*. The size of the winding core 111*a* was set to 1.0 mm in width, 0.36 mm in height and 1.4 mm in length. The size of each flange part 111*b* was set to 1.6 mm in width, 0.6 mm in height and 0.3 mm in thickness.

A winding chip inductor 120, which is a coil component, had the aforementioned magnetic core 111 and a pair of sheet-like magnetic cores 112 that are not illustrated. This magnetic core 111 and the sheet-like magnetic cores 112 were made of the magnetic material 110 which was manufactured under the same conditions as explained in Example 1 from the same material grains used in Example 1. The sheet-like magnetic cores 112 connected the two flange parts 111*b*, 111*b* of the magnetic core 111, respectively. The size of each sheet-like magnetic core 112 was set to 2.0 mm in length, 0.5 mm in width and 0.2 mm in thickness. A pair of external conductive films 114 was formed on the mounting surfaces of the flange parts 111*b* of the magnetic core 111, respectively. Also, the winding core 111*a* of the magnetic core 111 was wound by a coil 115 constituted by an insulating covering conductive wire to form a winding part 115*a*, while both its ends 115*b* were thermocompression-bonded to the external conductive films 114 on the mounting surfaces of the flange parts 111*b*, respectively. Each external conductive film 114 had a baked conductive layer 114*a* formed on the surface of the magnetic material 110, as well as a Ni plating layer 114*b* and Sn plating layer 114*c* laminated on top of this baked conductive layer 114*a*. The aforementioned sheet-like magnetic cores 112 were bonded to the flange parts 111*b*, 111*b* of the magnetic core 111 using resin adhesive. The external conductive films 114 were formed on the surface of the magnetic material 110, and ends of the magnetic core were connected to the external conductive films 114. The external conductive films 114 were formed by preparing a paste by adding glass to silver and then baking the paste onto the magnetic material 110 at a specific temperature. When manufacturing the baked conductive film layer 114*a* constituting the external conductive film 114 on the surface of the magnetic material 110, specifically a bake-type electrode material paste containing metal grains and glass frit (bake-type Ag paste was used in this example) was coated onto the mounting surface of the flange part 111*b* of the magnetic core 111 constituted by the magnetic material 110, and then heat treatment was given in atmosphere to sinter and fix the electrode material directly onto the surface of the magnetic material 110. This way, a winding chip inductor was manufactured as a coil component.

EXAMPLE 7

In this example, a laminated inductor was manufactured as a coil component.

Figure 6:
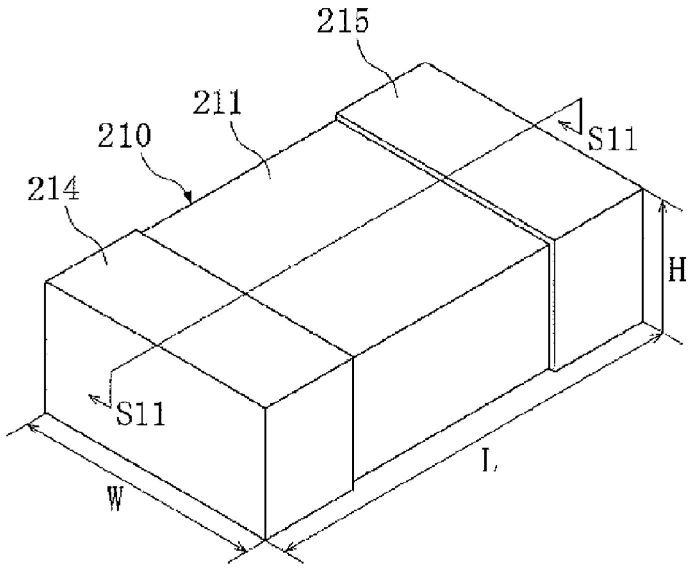
FIG. 6 is an external perspective view of a laminated inductor.
Figure 7:
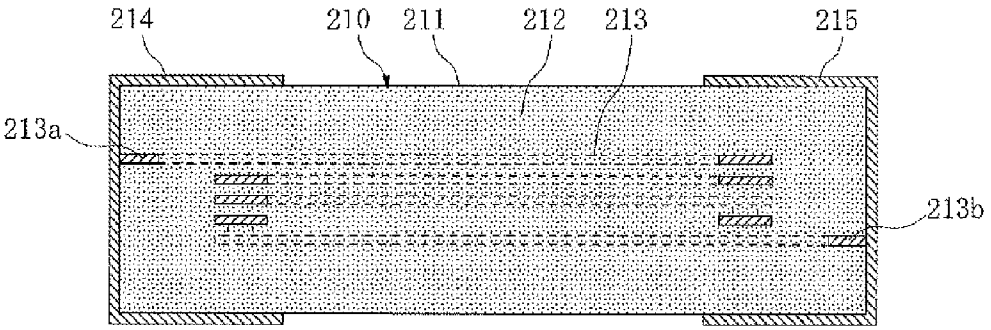
FIG. 7 is an enlarged section view taken along line S11-S11 in FIG. 6.
Figure 8:
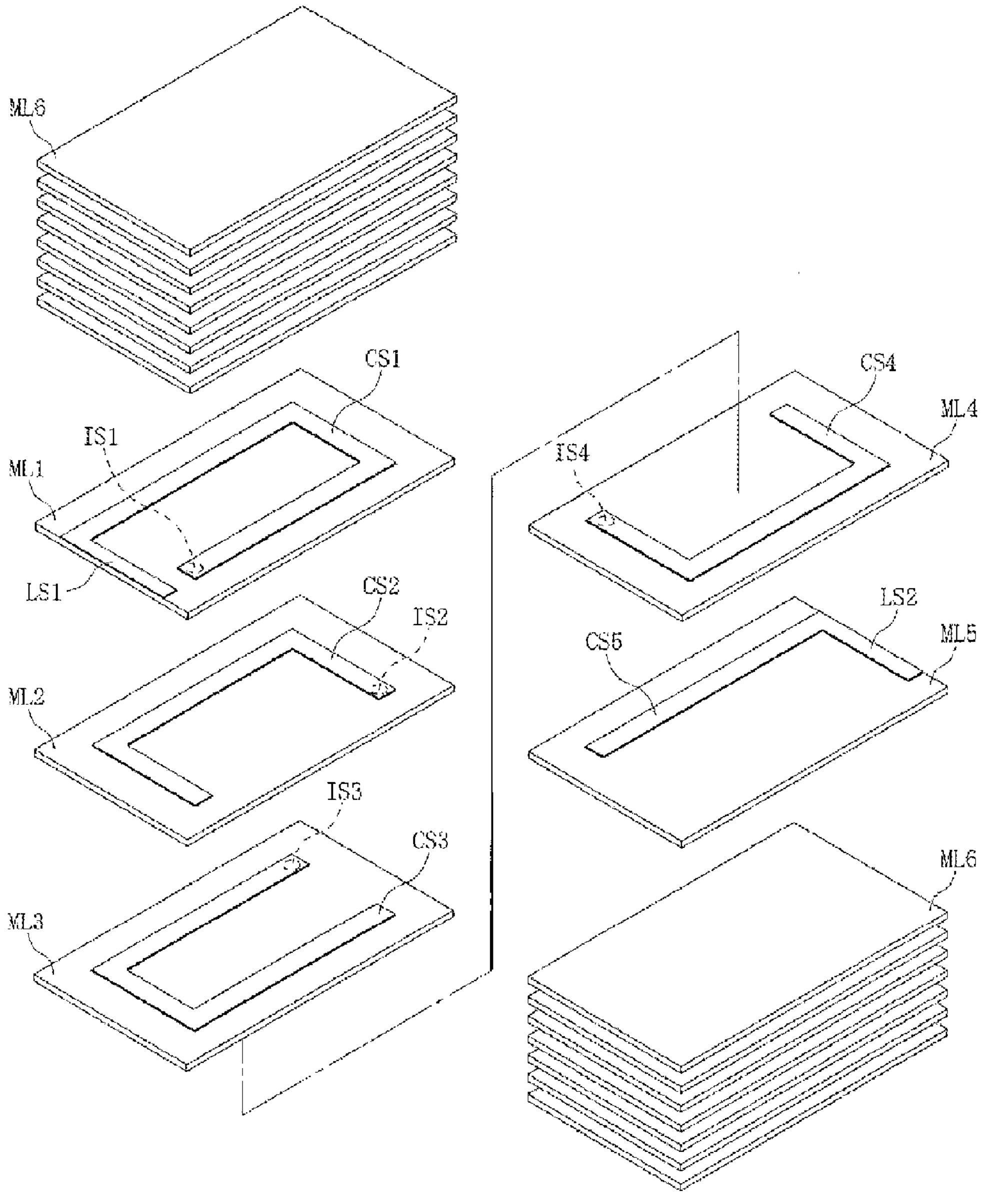
FIG. 8 is an exploded view of the main component body shown in FIG. 6.

FIG. 6 is an external perspective view of the laminated inductor. FIG. 7 is an enlarged section view taken along line S11-S11 in FIG. 6. FIG. 8 is an exploded view of the main component body shown in FIG. 6. A laminated inductor 210 manufactured in this example had a length L of approx. 3.2 mm, width W of approx. 1.6 mm, height H of approx. 0.8 mm, and overall shape of rectangular solid in FIG. 6. This laminated inductor 210 had a main component body 211 of rectangular solid shape, and a pair of external terminals 214, 215 provided at both ends in the length direction of the main component body 211. The main component body 211 had a magnetic body 212 of rectangular solid shape, and a helical coil 213 covered by the magnetic body 212, as shown in FIG. 7, where one end of the coil 213 was connected to the external terminal 214, while the other end was connected to the external terminal 215. The magnetic body 212 was structured in such a way that a total of 20 layers of magnetic layers ML1 to ML6 were put together, as shown in FIG. 8, where the length was approx. 3.2 mm, width was approx. 1.6 mm and height was approx. 0.8 mm. The length, width and thickness of each of these magnetic layers ML1 to ML6 were approx. 3.2 mm, 1.6 mm and 40 μm, respectively. The coil 213 was structured in such a way that a total of five coil segments CS1 to CS5, and a total of four relay segments IS1 to IS4 connecting these coil segments CS1 to CS5, were put together in a helical pattern, where the number of windings was approx. 3.5. This coil 213 is made of Ag grains whose d50 was 5 μm.

The four coil segments CS1 to CS4 had a C shape, while the one coil segment CS5 had a shape of thin strip, and the thickness and width of each of these coil segments CS1 to CS5 were approx. 20 μm and 0.2 mm, respectively. The top coil segment CS1 had an integrally formed L-shaped leader part LS1 which was used to connect the external terminal 214, while the bottom coil segment CS5 also had an integrally formed L-shaped leader part LS2 which was used to connect the external terminal 215. The relay segments IS1 to IS4 formed columns that passed through the magnetic layers ML1 to ML4, respectively, where the bore of each column was approx. 15 μm. The external terminals 214, 215 covered the end faces in the length direction of the main component body 211 as well as four side faces near these end faces, where the thickness was approx. 20 μm. The one external terminal 214 connected to the edge of the leader part LS1 of the top coil segment CS1, while the other external terminal 215 connected to the edge of the leader part LS2 of the bottom coil segment CS5. These external terminals 214, 215 were made of Ag grains whose d50 was 5 μm.

When manufacturing the laminated inductor 210, a doctor blade was used as a coater to coat a prepared magnetic paste onto the surface of a plastic base film (not illustrated), and the coated film was dried using a hot-air dryer at approx. 80° C. for approx. 5 minutes, to make first to sixth sheets corresponding to the magnetic layers ML1 to ML6 (refer to FIG. 8) and also suitable for multiple part processing. The magnetic paste was constituted by 85 percent by weight of material grains used in Example 1, 13 percent by weight of butyl carbitol (solvent) and 2 percent by weight of polyvinyl butyral (binder). Next, a stamping machine was used to pierce the first sheet corresponding to the magnetic layer ML1, to form through holes in a specific layout corresponding to the relay segment IS1. Similarly, through holes were formed in specific layouts corresponding to the relay segments IS2 to IS4, on the second to fourth sheets corresponding to the magnetic layers ML2 to ML4.

Next, a screen printer was used to print a prepared conductive paste onto the surface of the first sheet corresponding to the magnetic layer ML1, and the printed sheet was dried using a hot-air dryer at approx. 80° C. for approx. 5 minutes, to make a first printed layer in a specific layout corresponding to the coil segment CS1. Similarly, second to fifth printed layers corresponding to the coil segments CS2 to CS5 were made in specific layouts on the surfaces of the second to fifth sheets corresponding to the magnetic layers ML2 to ML5. The conductive paste had a composition of 85 percent by weight of Ag material, 13 percent by weight of butyl carbitol (solvent) and 2 percent by weight of polyvinyl butyral (binder). Since the through holes formed in specific layouts on the first to fourth sheets corresponding to the magnetic layers ML1 to ML4 were overlapped at the edges of the first to fourth printed layers in specific layouts, a part of the conductive paste was filled in each through hole when the first to fourth printed layers were printed, to form first to fourth filled parts corresponding to the relay segments IS1 to IS4.

Next, a suction transfer machine and press machine (both not illustrated) were used to thermocompress a stack, in the order shown in FIG. 8, of the first to fourth sheets each having a printed layer and filled part (corresponding to the magnetic layers ML1 to ML4), the fifth sheet only having a printed layer (corresponding to the magnetic layer ML5), and the sixth sheet having neither printed layer nor filled part (corresponding to the magnetic layer ML6), to make a laminate. Next, a dicing machine was used to cut the laminate to the size of the main component body to make a chip before heat treatment (including a magnetic body and coil before heat treatment). Next, a baking furnace, etc., was used to heat-treat multiple chips before heat treatment in batch in atmosphere. This heat treatment included a binder removal process and an oxide film-forming process, where the binder removal process was implemented at approx. 300° C. for approx. 1 hour, while the oxide film-forming process was implemented at approx. 750° C. for approx. 2 hours. Next, a dip coater was used to coat the aforementioned conductive paste onto both edges in the length direction of the main component body 211, and then the coated component was baked in a baking furnace at approx. 600° C. for approx 0.1 hour, thereby eliminating the solvent and binder and sintering the Ag grains in the baking process, to make external terminals 214, 215. This way, a laminated inductor was manufactured as a coil component.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, “a” may refer to a species or a genus including multiple species.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments.

The present application claims priority to Japanese Patent Application No. 2011-100095, filed Apr. 27, 2011 and Japanese Patent Application No. 2011-222093, filed Oct. 6, 2011, the disclosure of which is incorporated herein by reference in its entirety. In some embodiments, as the magnetic body, those disclosed in co-assigned U.S. patent application Ser. No. 13/092,381 and Ser. No. 13/277,018 can be used, each disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A magnetic material constituted by a grain-compacted body comprising:

a plurality of metal grains made of a Fe—Si—M soft magnetic alloy (where M is a metal element more easily oxidized than Fe), and an oxide film formed on the surface of the metal grains;

wherein the oxide film is a film formed by oxidization of the metal grains and bonding the metal grains, which film is constituted by an oxide of the Fe—Si—M soft magnetic alloy of the metal grains, and the mol ratio of the metal element denoted by M relative to the Fe element in the oxide film is greater than the mol ratio of the metal element denoted by M relative to the Fe element in the metal grains; and wherein there are bonding portions via the oxide film formed on the surface of adjacent metal grains and bonding portions of metal grains bonding together where the oxide film is not present.

2. The magnetic material according to claim 1, wherein the bonding portions via the oxide film are portions where the oxide film formed on the surface of adjacent metal grains shows the same phase based on a SEM observation image of the oxide film formed on the surface of adjacent metal grains.

3. The magnetic material according to claim 1, wherein all the Fe—Si—M soft magnetic alloy is a Fe—Cr—Si soft magnetic alloy.

4. The magnetic material according to claim 2, wherein all the Fe—Si—M soft magnetic alloy is a Fe—Cr—Si soft magnetic alloy.

5. The magnetic material according to claim 1, wherein a B/N ratio where N represents the number of metal grains in a cross section of the grain-compacted body and B represents the number of bonding portions of metal grains bonding together, is in a range of 0.1 to 0.5.

6. The magnetic material according to claim 2, wherein a B/N ratio where N represents the number of metal grains in a cross section of the grain-compacted body and B represents the number of bonding portions of metal grains bonding together, is in a range of 0.1 to 0.5.

7. The magnetic material according to claim 1, wherein the magnetic material is in the form of a compact, the metal grains are constituted by a plurality of metal grains produced by an atomization method, and the oxidization is performed by heat-treating the compact in an oxidizing atmosphere.

8. The magnetic material according to claim 2, wherein the magnetic material is in the form of a compact, the metal grains are constituted by a plurality of metal grains produced by an atomization method, and the oxidization is performed by heat-treating the compact in an oxidizing atmosphere.

9. The magnetic material according to claim 1, wherein the grain-compacted body has voids inside and at least some of the voids are impregnated with a polymer resin.

10. The magnetic material according to claim 2, wherein the grain-compacted body has voids inside and at least some of the voids are impregnated with a polymer resin.

11. A coil component comprising the magnetic material according to claim 1 and a coil formed inside or on a surface of the magnetic material.

12. A coil component comprising the magnetic material according to claim 2 and a coil formed inside or on a surface of the magnetic material.

13. A coil component comprising the magnetic material according to claim 3 and a coil formed inside or on a surface of the magnetic material.

14. A coil component comprising the magnetic material according to claim 5 and a coil formed inside or on a surface of the magnetic material.

15. A coil component comprising the magnetic material according to claim 7 and a coil formed inside or on a surface of the magnetic material.

16. A coil component comprising the magnetic material according to claim 9 and a coil formed inside or on a surface of the magnetic material.

17. The magnetic material according to claim 1, wherein d50 of the metal grains is in a range of 2 μm to 30 μm.

* * * * *